United States Patent
Jung

(10) Patent No.: US 9,777,652 B2
(45) Date of Patent: Oct. 3, 2017

(54) METHOD AND SYSTEM OF DRIVER INDUCEMENT FOR VEHICLE

(71) Applicants: HYUNDAI MOTOR COMPANY, Seoul (KR); KIA MOTORS CORPORATION, Seoul (KR)

(72) Inventor: Jae Yoon Jung, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 14/853,559

(22) Filed: Sep. 14, 2015

(65) Prior Publication Data

US 2016/0290261 A1 Oct. 6, 2016

(30) Foreign Application Priority Data

Apr. 2, 2015 (KR) .................. 10-2015-0046991

(51) Int. Cl.
*F02D 41/02* (2006.01)
*F01N 3/20* (2006.01)
(Continued)

(52) U.S. Cl.
CPC ........... *F02D 41/0235* (2013.01); *F01N 3/00* (2013.01); *F01N 3/021* (2013.01); *F01N 3/2073* (2013.01);
(Continued)

(58) Field of Classification Search
CPC ........ F02D 41/0235; F01N 3/021; F01N 3/08; F01N 3/2073; F01N 11/00; F01N 2240/25; G01C 21/3469
(Continued)

(56) References Cited

U.S. PATENT DOCUMENTS

| 8,473,178 B2* | 6/2013 | Oe ................. B60K 6/365 60/285 |
| 2006/0184307 A1* | 8/2006 | Kosaka ............. F01N 3/206 701/110 |

(Continued)

FOREIGN PATENT DOCUMENTS

| JP | 2006-226204 A | 8/2006 |
| JP | 2008-163919 A | 7/2008 |

(Continued)

*Primary Examiner* — John Kwon
*Assistant Examiner* — Johnny H Hoang
(74) *Attorney, Agent, or Firm* — McDermott Will & Emery LLP

(57) ABSTRACT

A driver inducement method and a driver inducement system for a vehicle that induce a driver to replenish a urea considering a urea level in a urea tank and an actual vehicle speed are disclosed. The driver inducement method may include: calculating a first residual travel distance according to a urea level and an average urea consumption if an engine is started; calculating a final residual travel distance based on the first residual travel distance according to the urea level and the average urea consumption and a second residual travel distance according to the urea level and a vehicle speed, if the first residual travel distance according to the urea level and the average urea consumption is smaller than a threshold distance; and limiting an engine output according to the final residual travel distance.

14 Claims, 5 Drawing Sheets

(51) Int. Cl.
  *F01N 3/021* (2006.01)
  *F01N 11/00* (2006.01)
  *F01N 3/00* (2006.01)
  *G01C 21/34* (2006.01)
  *F02D 41/22* (2006.01)
(52) U.S. Cl.
  CPC .......... *F01N 11/00* (2013.01); *F01N 2240/25* (2013.01); *F02D 2041/228* (2013.01); *F02D 2250/26* (2013.01); *G01C 21/3469* (2013.01)
(58) Field of Classification Search
  USPC ....... 701/29.2, 30.5, 30.8, 96, 102, 110, 115
  See application file for complete search history.

(56) References Cited

U.S. PATENT DOCUMENTS

2007/0204678 A1* 9/2007 Nishina .................. F01N 3/208
  73/53.01
2014/0188327 A1* 7/2014 Jung ..................... F01N 11/002
  701/29.2

FOREIGN PATENT DOCUMENTS

| JP | 4375248 B2 | 12/2009 |
| JP | 4416750 B2 | 2/2010 |
| JP | 2014-118946 A | 6/2014 |
| KR | 10-0907363 B1 | 7/2009 |
| KR | 10-2014-0089018 A | 7/2014 |

* cited by examiner

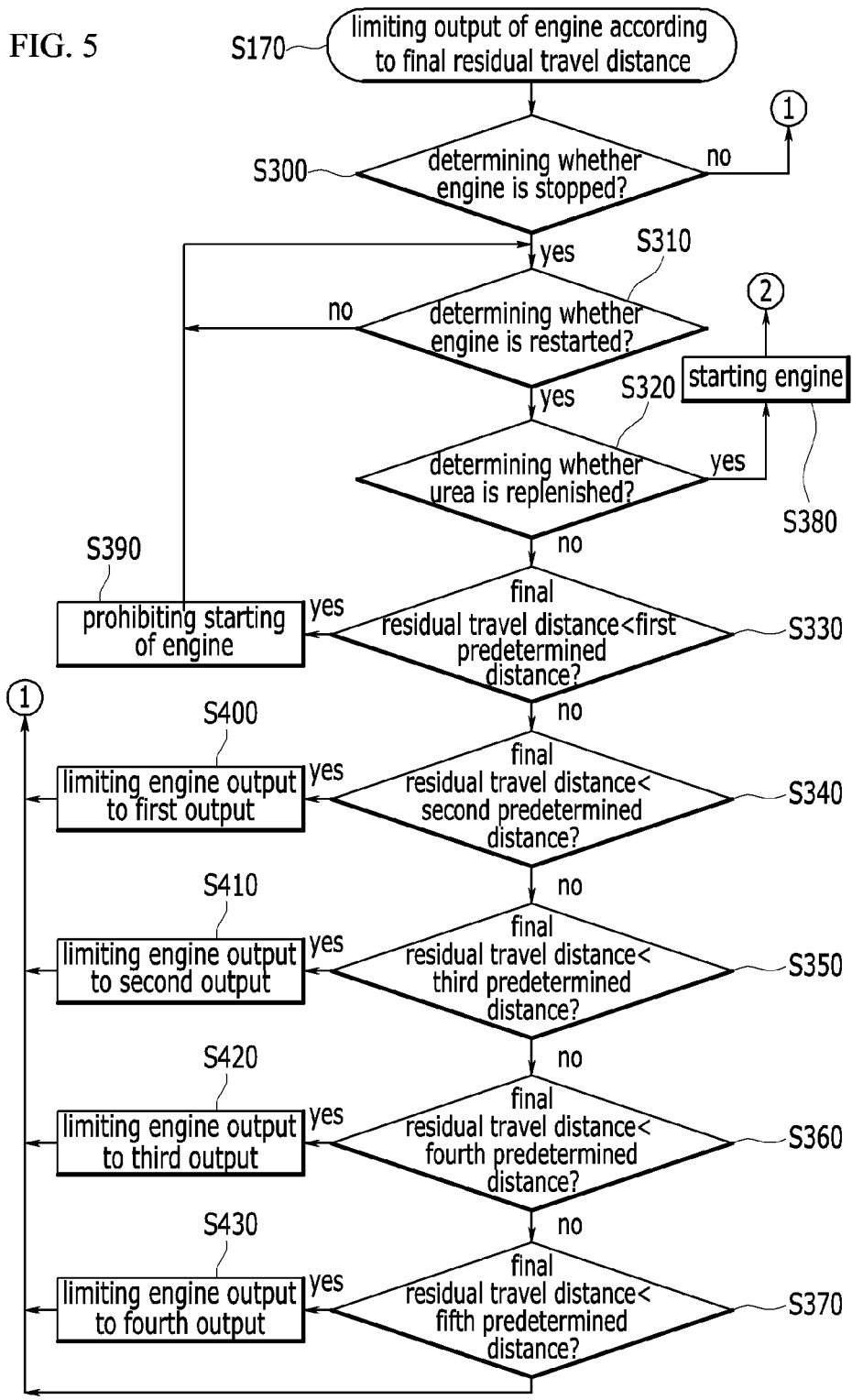

METHOD AND SYSTEM OF DRIVER INDUCEMENT FOR VEHICLE

CROSS-REFERENCE TO RELATED APPLICATION

This application claims priority to and the benefit of Korean Patent Application No. 10-2015-0046991 filed in the Korean Intellectual Property Office on Apr. 2, 2015, the entire contents of which are incorporated herein by reference.

TECHNICAL FIELD

The present disclosure relates to a driver inducement method and a driver inducement system for a vehicle, and more particularly, to a driver inducement method and a driver inducement system for a vehicle that induce a driver to replenish a urea considering a urea level in a urea tank and an actual vehicle speed.

BACKGROUND

Generally, an exhaust gas exhausted through an exhaust manifold from an engine is led to a catalytic converter formed on an exhaust pipe and is purified. After that, noise of the exhaust gas is reduced when the exhaust gas passes through a muffler and is exhausted to the air through a tail pipe.

A selective catalytic reduction (SCR) converter is one type of such catalytic converters.

The SCR means that reducing agents such as urea, ammonia, carbon monoxide and hydrocarbon (HC) react better with nitrogen oxide than oxygen.

An exhaust system of a vehicle provided with the SCR converter includes a urea tank and a dosing module. The dosing module injects the reducing agents such as the urea into the exhaust gas passing through the exhaust pipe. Thereby, the SCR converter can reduce the nitrogen oxide efficiently.

However, if the urea is insufficient in the urea tank, nitrogen oxide in the exhaust gas cannot be sufficiently purified and is exhausted to the exterior even though the SCR converter is mounted at the vehicle. Therefore, regulations demand that means for inducing a driver to replenish the urea if the urea in the urea tank is insufficient should be mounted at the vehicle. This is called a driver inducement.

If a urea level in the urea tank is lower than a predetermined level, a conventional driver inducement method induces a driver to replenish the urea. However, a urea consumption is closely related to an actual operating state of the vehicle, particularly to a vehicle speed. Therefore, even though the vehicle can run hundreds of kilometers, driver inducement needs to be performed because of a low urea level.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a driver inducement method and a driver inducement system having advantages of inducing a driver to replenish a urea considering a urea level in a urea tank and an actual vehicle speed.

A driver inducement method according to an exemplary embodiment of the present invention may include: calculating a first residual travel distance according to a urea level and an average urea consumption if an engine is started; calculating a final residual travel distance based on the first residual travel distance according to the urea level and the average urea consumption and a second residual travel distance according to the urea level and a vehicle speed, if the residual travel distance according to the urea level and the average urea consumption is smaller than a threshold distance; and limiting an engine output according to the final residual travel distance.

The final residual travel distance may be calculated as a minimum value of the first residual travel distance according to the urea level and the average urea consumption and the second residual travel distance according to the urea level and the vehicle speed.

The method may further include outputting a warning if the residual travel distance according to the urea level and the average urea consumption is smaller than the threshold distance.

The limiting an engine output according to the final residual travel distance may be performed when the engine is restarted after being stopped.

The limiting an engine output according to the final residual travel distance may further include prohibiting restart of the engine if the final residual travel distance is smaller than a first predetermined distance.

In one aspect, the engine output may be limited inversely proportional to the final residual travel distance.

In another aspect, the limiting an engine output according to the final residual travel distance may include classifying the final residual travel distance into one of a plurality of distance ranges, and limiting the engine output to an output value corresponding to the classified distance range. The output value is lowered as the final residual travel distance is determined to be smaller.

A driver inducement system according to another exemplary embodiment of the present invention may include: an engine generating power; a urea level sensor detecting a urea level; a vehicle speed sensor detecting a vehicle speed; and a controller electrically connected to the urea level sensor and the vehicle speed sensor, calculating a first residual travel distance according to the urea level and an average urea consumption and a second residual travel distance according to the urea level and the vehicle speed, calculating a final residual travel distance based on the first and second residual travel distances, and limiting an engine output or prohibiting engine starting according to the final residual travel distance.

The controller may calculate the final residual travel distance as a minimum value of the first residual travel distance according to the urea level and the average urea consumption and the second residual travel distance according to the urea level and the vehicle speed.

The controller may issue a warning if the residual travel distance according to the urea level and the average urea consumption is smaller than a threshold distance.

The controller may limit the engine output when the engine is restarted or prohibiting the engine starting according to the final residual travel distance that is calculated before the engine is stopped.

The controller may prohibit restart of the engine if the final residual travel distance is smaller than a first predetermined distance.

In one aspect, the controller may limit the engine output inversely proportional to the final residual travel distance.

In another aspect, the controller may classify the final residual travel distance into one of a plurality of distance ranges and may limit the engine output to an output value corresponding to the classified distance range. The output value is lowered as the final residual travel distance is determined to be smaller.

As described above, since a final residual travel distance is calculated by considering a urea amount in a urea tank and a vehicle speed, and engine starting is prohibited or an engine output is limited according to the final residual travel distance, a driver is induced to replenish the urea.

BRIEF DESCRIPTION OF THE DRAWINGS

FIG. 5 is a flowchart of limiting an output according to a final residual travel distance in FIG. 3.

DETAILED DESCRIPTION

An exemplary embodiment of the present invention will hereinafter be described in detail with reference to the accompanying drawings.

Figure 1:
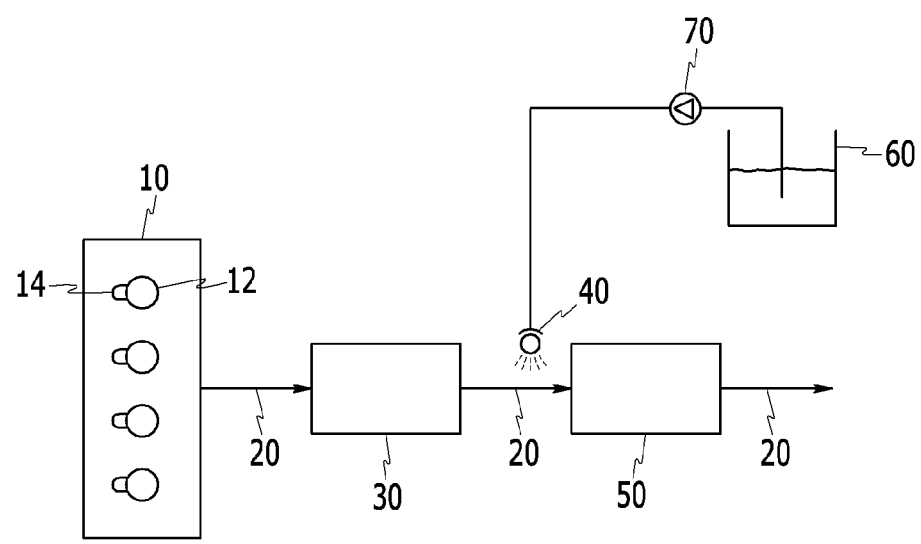
FIG. 1 is a schematic diagram of an exemplary exhaust system to which a driver inducement method and a driver inducement system according to an exemplary embodiment of the present invention can be applied.

FIG. 1 is a schematic diagram of an exemplary exhaust system to which a driver inducement method and a driver inducement system according to an exemplary embodiment of the present invention can be applied.

As shown in FIG. 1, an exhaust gas generated at an engine 10 passes sequentially through a particulate filter 30 and a selective catalytic reduction (SCR) converter 50. In this process, noxious materials contained in the exhaust gas can be removed. Alternatively, an oxidation catalyst instead of the particulate filter 30 may be used or the oxidation catalyst as well as the particulate filter 30 may be used. The particulate filter 30 and the SCR converter 50 are mounted on an exhaust pipe 20.

The engine 10 burns air-fuel mixture in which fuel and air are mixed so as to convert chemical energy into mechanical energy. The engine 10 is connected to an intake manifold so as to receive the air into a combustion chamber 12, and is connected to an exhaust manifold so as to discharge the exhaust gas generated at a combustion process and gathered in the exhaust manifold to the exterior of a vehicle. An injector 14 is mounted in the combustion chamber 12 so as to inject the fuel into the combustion chamber.

The exhaust pipe 20 is connected to the exhaust manifold and the exhaust gas is exhausted to the exterior of the vehicle through the exhaust pipe 20.

The particulate filter 30 is mounted on the exhaust pipe 20 downstream of the engine 10 and traps soot contained in the exhaust gas.

The SCR converter 50 is mounted on the exhaust pipe 20 downstream of the particulate filter 30 and reduces nitrogen oxide contained in the exhaust gas into nitrogen gas using reducing agent.

For these purposes, the exhaust system further includes a urea tank 60, a urea pump 70 and a dosing module 40.

The urea tank 60 stores urea therein.

The urea pump 70 pumps the urea from the urea tank 60 to the dosing module 40.

The dosing module 40 injects the urea pumped by the urea pump 70 into the exhaust pipe 20. The dosing module 40 is mounted on the exhaust pipe 20 between the particulate filter 30 and the SCR converter 50 and injects the urea to the exhaust gas that flows into the SCR converter 50. The urea injected to the exhaust gas is decomposed into ammonia so that the decomposed ammonia is used as the reducing agent for the nitrogen oxide.

Figure 2:
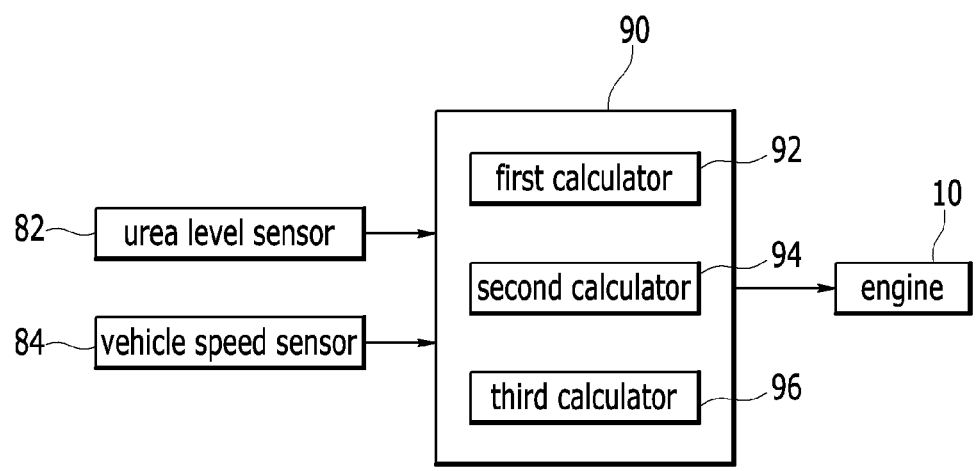
FIG. 2 is a block diagram of a driver inducement system for a vehicle according to an exemplary embodiment of the present invention.

FIG. 2 is a block diagram of a driver inducement system for a vehicle according to an exemplary embodiment of the present invention.

As shown in FIG. 2, a driver inducement system for a vehicle according to an exemplary embodiment of the present invention includes a urea level sensor 82, a vehicle speed sensor 84, a controller 90 and the engine 10.

The urea level sensor 82 is mounted at the urea tank 60 and detects a urea level in the urea tank 60 using ultrasonic waves. Herein, the urea level is a value which does not change if the urea is not supplied nor consumed. The urea level sensor 82 transmits information on the detected urea level to the controller 90.

The vehicle speed sensor 84 is mounted at a wheel or a transmission of the vehicle and detects a current vehicle speed. The vehicle speed sensor 84 transmits information on the detected vehicle speed to the controller 90.

The controller 90 is electrically connected to the urea level sensor 82 and the vehicle speed sensor 84 and receives information on the urea level and the vehicle speed from the urea level sensor 82 and the vehicle speed sensor 84, respectively. The controller 90 includes first, second, and third calculators 92, 94, and 96.

The first calculator 92 includes a travel distance according to an average urea consumption stored therein. That is, the average of the travel distance that the vehicle can run with a predetermined urea consumption is stored. The travel distance according to the average urea consumption may be determined through experiments and may be stored in the first calculator 92, or may be a value learned when the vehicle actually runs. The first calculator 92 calculates a first residual travel distance according to the urea level and the average urea consumption.

The second calculator 94 includes a travel distance that the vehicle can run with a basic urea consumption according to the vehicle speed. That is, the average of the travel distance that the vehicle can run with the basic urea consumption if the vehicle runs with a specific vehicle speed is stored. The travel distance that the vehicle can run with the basic urea consumption according to the vehicle speed may be determined through experiments and may be stored in the second calculator 94, or may be a value learned when the vehicle actually runs. The second calculator 94 calculates a second residual travel distance according to the urea level and the vehicle speed.

The third calculator 96 calculates a final residual travel distance based on the first residual travel distance according to the urea level and the average urea consumption received from the first calculator 92 and the second residual travel distance according to the urea level and the vehicle speed received from the second calculator 94.

The controller 90 limits an output of the engine 10 or prohibits starting of the engine 10 based on the final residual travel distance. For this purpose, the controller 90 can be realized by one or more processors activated by predetermined program, and the predetermined program may be pre-stored in a non-transitory computer-readable recording medium accessible by the one or more processors and may be programmed to perform each step of a driver inducement method for a vehicle when executed by the one or more processors according to an exemplary embodiment of the present invention.

Figure 3:
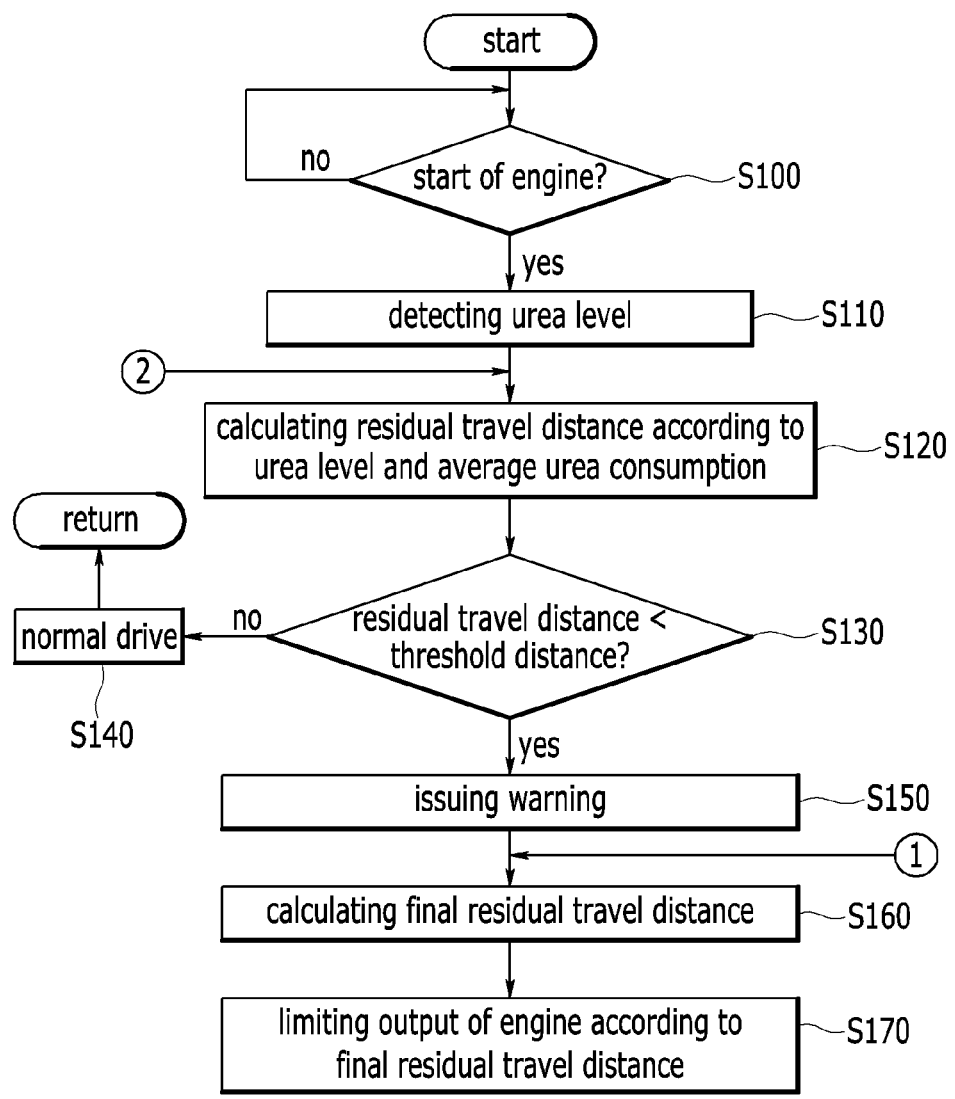
FIG. 3 is a flowchart of a driver inducement method for a vehicle according to an exemplary embodiment of the present invention.
Figure 4:
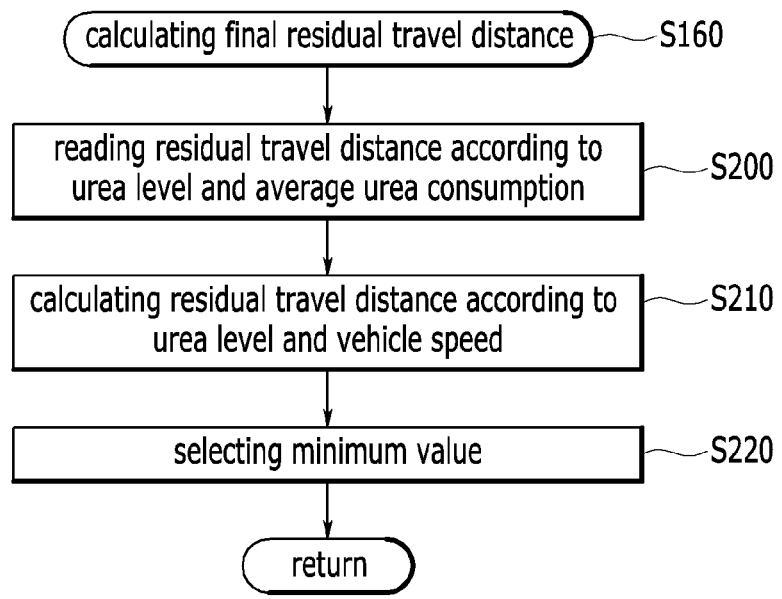
FIG. 4 is a flowchart of calculating a final residual travel distance in FIG. 3.

FIG. 3 to FIG. 5 are flowcharts of the driver inducement method for the vehicle according to an exemplary embodiment of the present invention.

As shown in FIG. 3, the driver inducement method for the vehicle according to the exemplary embodiment of the present invention begins with determining whether the engine 10 is started at step S100. If the engine 10 is started, the urea level sensor 82 detects the urea level at step S110 and transmits information thereon to the controller 90. The controller 90 calculates the first residual travel distance according to the urea level and the average urea consumption at step S120. After that, the controller 90 determines whether the first residual travel distance according to the urea level and the average urea consumption is smaller than a threshold distance at step S130. The threshold distance means a distance at which the driver inducement method should be performed. The threshold distance may be predetermined, for example, to be a value of 1,800 km-2,200 km.

If the first residual travel distance according to the urea level and the average urea consumption is larger than or equal to the threshold distance, the controller 90 controls the vehicle to run normally at step S140.

If the first residual travel distance according to the urea level and the average urea consumption is smaller than the threshold distance, the controller 90 issues a warning at step S150. That is, is the warning may be displayed on a cluster (e.g., lightening a warning lamp, etc.) or on a display of the vehicle, or be audibly output through a speaker that the urea should be replenished.

After that, the controller 90 calculates the final residual travel distance for a precise driver inducement at step S160. Hereinafter, calculation of the final residual travel distance will be described in detail referring to FIG. 4.

Firstly, the controller 90 reads the first residual travel distance according to the urea level and the average urea consumption calculated at the step S120 at step S200. In addition, the controller 90 calculates the second residual travel distance according to the urea level and the vehicle speed at step S210.

After that, the controller 90 selects a minimum value of the first residual travel distance according to the urea level and the average urea consumption and the second residual travel distance according to the urea level and the vehicle speed as the final residual travel distance at step S220. That is, the controller 90 calculates the minimum value of the first and second residual travel distances according to the average urea consumption and the actual vehicle speed as the final residual travel distance for a stable drive of the vehicle.

After that, the controller 90 limits the output of the engine 10 according to the final residual travel distance at step S170. Hereinafter, limiting the output of the engine 10 according to the final residual travel distance will be described in detail referring to FIG. 5.

Firstly, the controller 90 determines whether the engine 10 is stopped at step S300. That is, the exemplary embodiment of the present invention is configured to limit the output of the engine 10 according to the final residual travel distance calculated when the engine 10 is stopped at restart of the engine 10. Therefore, if the engine 10 is not stopped at the step S300, the controller 90 returns to the step S160 and continuously calculates the final residual travel distance.

If the engine 10 is stopped at the step S300, the controller 90 determines whether a request for restarting the engine 10 is output at step S310. If a driver moves an ignition key to a starting position or presses a starting button, it is determined that the request for restarting the engine 10 is output.

If it is determined that the request for restarting the engine 10 is output at the step S310, the controller 90 determines whether the urea is replenished at step S320. If a difference between the urea level before stopping of the engine 10 and the urea level at restart of the engine 10 is larger than or equal to a predetermined value, it is determined that the urea is replenished.

If the urea is replenished at the step S320, the controller 90 starts the engine 10 at step S380 and returns to the step S120. In this case, since the first residual travel distance according to the urea level and the average urea consumption becomes larger than the threshold distance, the vehicle runs normally at the step S140.

If the urea is not replenished at the step S320, the controller 90 determines whether the final residual travel distance is smaller than a first predetermined distance at step S330. The first predetermined distance may be a value of 20 km-40 km. If the final residual travel distance is smaller than the first predetermined distance at the step S330, the controller 90 prohibits starting of the engine 10 at step S390 and returns to the step S310. At this time, the controller 90 displays on the cluster or the display of the vehicle that the urea should be replenished (e.g., lightening the warning lamp, etc.) or audibly issues the warning through the speaker. For example, a sentence such as "The engine cannot be started because of lack of urea. Please replenish the urea." may be output through the speaker.

If the final residual travel distance is larger than or equal to the first predetermined distance at the step S330, the controller 90 determines whether the final residual travel distance is smaller than a second predetermined distance at step S340. The second predetermined distance may be, for example, a value of 225 km-275 km, greater than the first predetermined distance. If the final residual travel distance is smaller than the second predetermined distance at the step S340, the controller 90 limits the output of the engine 10 to a first output at step S400. The first output may be 15%-25% of the maximum output of the engine 10. After that, the controller 90 returns to the step S160.

If the final residual travel distance is larger than or equal to the second predetermined distance at the step S340, the controller 90 determines whether the final residual travel distance is smaller than a third predetermined distance at step S350. The third predetermined distance may be a value of 450 km-550 km, greater than the second predetermined distance. If the final residual travel distance is smaller than the third predetermined distance at the step S350, the controller 90 limits the output of the engine 10 to a second output which is greater than the first output at step S410. The second output may be 35%-45% of the maximum output of the engine 10. After that, the controller 90 returns to the step S160.

If the final residual travel distance is larger than or equal to the third predetermined distance at the step S350, the controller 90 determines whether the final residual travel distance is smaller than a fourth predetermined distance at step S360. The fourth predetermined distance may be, for example, a value of 900 km-1,100 km, greater than the third predetermined distance. If the final residual travel distance is smaller than the fourth predetermined distance at the step S360, the controller 90 limits the output of the engine 10 to a third output which is greater than the second output at step S420. The third output may be 55%-65% of the maximum output of the engine 10. After that, the controller 90 returns to the step S160.

If the final residual travel distance is larger than or equal to the fourth predetermined distance at the step S360, the controller 90 determines whether the final residual travel distance is smaller than a fifth predetermined distance at step S370. The fifth predetermined distance may be, for example, a value of 1,400 km-1,600 km, greater than the fourth predetermined distance. If the final residual travel distance is smaller than the fifth predetermined distance at the step S370, the controller 90 limits the output of the engine 10 to a fourth output which is greater than the third output at step S430. The fourth output may be 75%-85% of the maximum output of the engine 10. After that, the controller 90 returns to the step S160.

In addition, if the final residual travel distance is larger than or equal to the fifth predetermined distance at the step S370, the controller 90 does not limits the output of the engine 10 and returns to the step S160.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A driver inducement method for a vehicle comprising:
   calculating a first residual travel distance according to a urea level and an average urea consumption if an engine is started;
   calculating a final residual travel distance based on the first residual travel distance, according to the urea level and the average urea consumption, and a second residual travel distance, according to the urea level and a vehicle speed, if the first residual travel distance according to the urea level and the average urea consumption is smaller than a threshold distance; and
   limiting an engine torque according to the final residual travel distance.

2. The driver inducement method of claim 1, wherein the final residual travel distance is calculated as a minimum value of the first residual travel distance, according to the urea level and the average urea consumption, and the second residual travel distance, according to the urea level and the vehicle speed.

3. The driver inducement method of claim 1, further comprising outputting a warning, if the first residual travel distance according to the urea level and the average urea consumption is smaller than the threshold distance.

4. The driver inducement method of claim 1, wherein the limiting the engine torque according to the final residual travel distance is performed when the engine is restarted after being stopped.

5. The driver inducement method of claim 1, wherein the limiting the engine torque according to the final residual travel distance further comprises prohibiting restart of the engine, if the final residual travel distance is smaller than a first predetermined distance.

6. The driver inducement method of claim 1, wherein the engine torque is limited inversely proportional to the final residual travel distance.

7. The driver inducement method of claim 1, wherein the limiting an engine torque according to the final residual travel distance comprises classifying the final residual travel distance into one of a plurality of distance ranges, and limiting the engine torque to an output value corresponding to the classified distance range, and
   wherein the output value is lowered as the final residual travel distance is determined to be smaller.

8. A driver inducement system for a vehicle comprising:
   an engine generating power;
   a urea level sensor detecting a urea level;
   a vehicle speed sensor detecting a vehicle speed; and
   a controller electrically connected to the urea level sensor and the vehicle speed sensor, wherein the controller
   calculates a first residual travel distance according to the urea level and an average urea consumption and a second residual travel distance according to the urea level and the vehicle speed,
   calculates a final residual travel distance based on the first and second residual travel distances, and
   limits an engine torque or prohibiting engine starting according to the final residual travel distance.

9. The driver inducement system of claim 8, wherein the controller calculates the final residual travel distance as a minimum value of the first residual travel distance, according to the urea level and the average urea consumption, and the second residual travel distance, according to the urea level and the vehicle speed.

10. The driver inducement system of claim 8, wherein the controller issues a warning, if the residual travel distance according to the urea level and the average urea consumption is smaller than a threshold distance.

11. The driver inducement system of claim 8, wherein the controller limits the engine torque when the engine is restarted or prohibiting the engine starting according to the final residual travel distance that is calculated before the engine is stopped.

12. The driver inducement system of claim 11, wherein the controller prohibits restart of the engine, if the final residual travel distance is smaller than a first predetermined distance.

13. The driver inducement system of claim 11, wherein the controller limits the engine torque inversely proportional to the final residual travel distance.

14. The driver inducement system of claim 11, wherein the controller classifies the final residual travel distance into one of a plurality of distance ranges and limits the engine torque to an output value corresponding to the classified distance range, and wherein the output value is lowered as the final residual travel distance is determined to be smaller.

* * * * *